United States Patent [19]

Kimura

[11] Patent Number: 5,592,339
[45] Date of Patent: Jan. 7, 1997

[54] INFORMATION SIGNAL RECORDING APPARATUS HAVING AN AUDIO EDITING FUNCTION

[75] Inventor: Norio Kimura, Kanagawa-ken, Japan

[73] Assignee: Canon Kabushiki Kaisha, Tokyo, Japan

[21] Appl. No.: 361,851

[22] Filed: Dec. 21, 1994

Related U.S. Application Data

[63] Continuation of Ser. No. 272,905, Jul. 8, 1994, abandoned, which is a continuation of Ser. No. 182,377, Jan. 14, 1994, abandoned, which is a continuation of Ser. No. 879,713, May 6, 1992, abandoned, which is a continuation of Ser. No. 432,057, Nov. 6, 1989, abandoned.

[30] Foreign Application Priority Data

Nov. 11, 1988 [JP] Japan ................................. 63-285142

[51] Int. Cl.$^6$ ........................... G11B 27/02; G11B 5/00; G11B 5/09
[52] U.S. Cl. ................................. 360/13; 360/8; 360/51
[58] Field of Search ................................. 360/8, 13, 15, 360/31, 32, 60, 66, 9.1, 11.1, 14.1, 51, 33.1, 35.1; 369/83, 84, 60; 358/311

[56] References Cited

U.S. PATENT DOCUMENTS

| | | | |
|---|---|---|---|
| 4,816,928 | 3/1989 | Sasaki et al. | 360/9.1 |
| 4,819,087 | 4/1989 | Takeuchi et al. | 360/14.3 |
| 4,891,715 | 1/1990 | Levy | 360/14.1 |
| 5,023,730 | 6/1991 | Sakata et al. | 360/8 |
| 5,081,538 | 1/1992 | Takei et al. | 360/35.1 |

*Primary Examiner*—W. Chris Kim
*Attorney, Agent, or Firm*—Robin, Blecker, Daley & Driscoll

[57] ABSTRACT

An information signal recording apparatus for recording information signals on a recording medium comprises information signals which are input to the apparatus in a predetermined quantity. The apparatus is adapted to retain the information signals thus input and allows an arbitrary portion of the predetermined quantity of information signals to be designated. The designated portion of the predetermined quantity of information signals can be edited before the information signals are recorded on the recording medium, thus making it possible to record on the recording medium the information signals with an arbitrary portion of the predetermined quantity deleted or corrected.

8 Claims, 3 Drawing Sheets

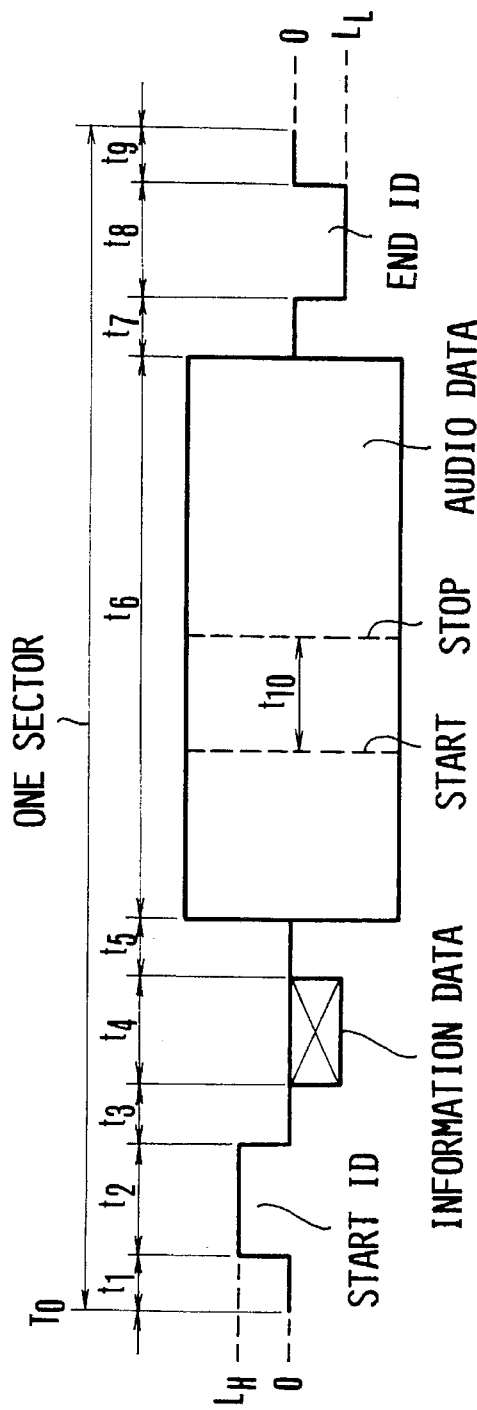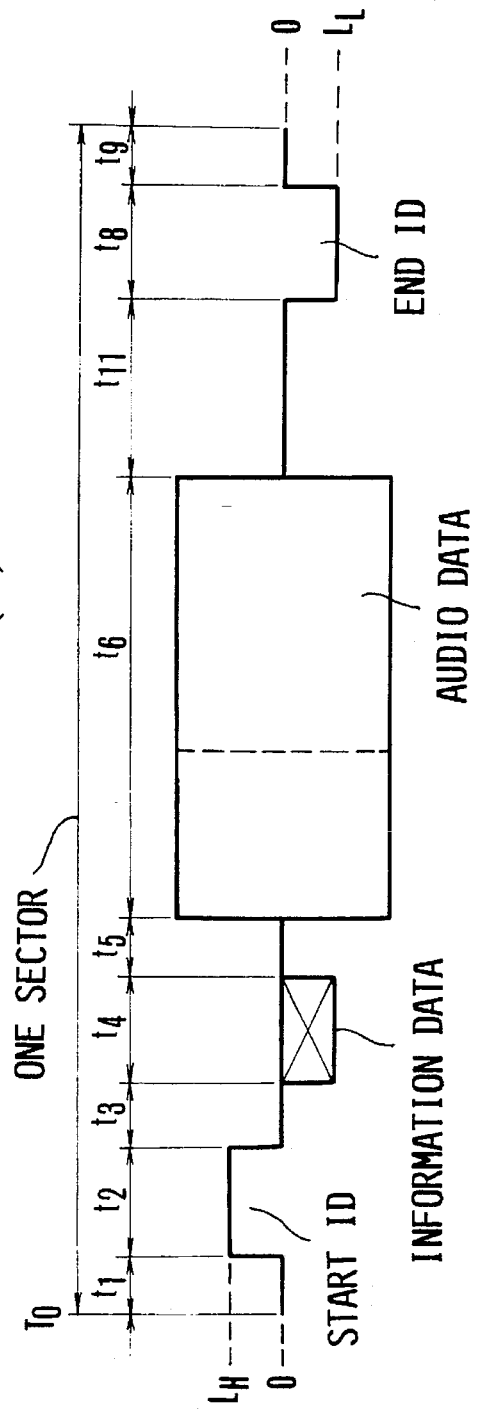

INFORMATION SIGNAL RECORDING APPARATUS HAVING AN AUDIO EDITING FUNCTION

This is a continuation application under 37 CFR 1.62 of prior application Ser. No. 08/272,905, filed Jul. 8, 1994, now abandoned, which is a continuation of Ser. No. 08/182,377 filed Jan. 14, 1994 (now abandoned), which is a continuation of Ser. No. 07/879,713, filed May 6, 1992 (now abandoned), which is a continuation of Ser. No. 07/432,057, filed Nov. 6, 1989.

BACKGROUND OF THE INVENTION

1. Field of the Invention

This invention relates to an informational signal recording apparatus for recording information signals.

2. Description of the Related Art

A still video system is an example of conventional apparatus for recording information signals on recording media.

It employs a magnetic disk having 50 recording tracks which are formed concentrically thereon and on each of which video signals for one field or audio signals for a predetermined time are recorded.

When recording, for example, audio signals by means of this system, the audio signals to be recorded are temporarily recorded in a memory device, and, by reading them therefrom faster than they were recorded, the signals are time-axis-compressed. Afterwards, the signals are FM-modulated, and are recorded on a magnetic disk.

In this system, the original time length of signals recorded on one track differs from track to track in accordance with the time-axis-compression rate. The currently available audio-recording format provides two types of recording mode: one of them allows the recording of a 10-second sound, and the other a 20-second sound.

However, the following problem is experienced with conventional still video systems: If, in recording, for example, audio signals representing a narration or the like, wrong audio signals have been recorded by mistake, the recording has to be performed again from the beginning, recording again those parts where the recording had been correctly effected the first time. This task is quite bothersome.

SUMMARY OF THE INVENTION

It is accordingly an object of this invention to provide an information signal recording apparatus which is capable of eliminating the problem mentioned above.

Another object of this invention is to provide an information signal recording apparatus which allows information signals to be recorded after deleting or correcting arbitrary portions thereof.

In one aspect of this invention, these objects can be achieved by providing an apparatus for recording information signals on a recording medium, comprising:

retaining means, arranged to input information signals for each predetermined quantity, for retaining the predetermined quantity of information signals thus input;

designating means for designating an arbitrary portion of the predetermined quantity of information signals retained by the retaining means; and recording means for editing that portion of the predetermined quantity of information signals designated by the designating means and for recording, on the recording medium, the information signals with the designated portion thereof thus edited.

Another object of this invention is to provide an information signal recording apparatus which is capable of editing information signals and then time-axis-compressing them before recording them on a recording medium.

The above object can be achieved in another aspect of this invention by providing an apparatus for recording information signals on a recording medium, comprising:

editing means, arranged to input information signals for each predetermined quantity, for editing the predetermined quantity of information signals thus input; and recording means for time-axis-compressing the information signals edited by the editing means and for recording the time-axis-compressed information signals on the recording medium.

Other objects and features of this invention will become apparent from the following detailed description of the preferred embodiments given with reference to the accompanying drawings.

BRIEF DESCRIPTION OF THE DRAWINGS

FIGS. 3(a) and 3(b) show the arrangement and composition of information signals recorded in one sector of an audio recording format for a still video system, of which:

FIG. 3(a) shows the condition before deleting part of the audio data; and

FIG. 3(b) shows the condition after deleting part of the audio data.

DETAILED DESCRIPTION OF THE PREFERRED EMBODIMENT

An embodiment of this invention will now be described with reference to the accompanying drawings.

Figure 1:
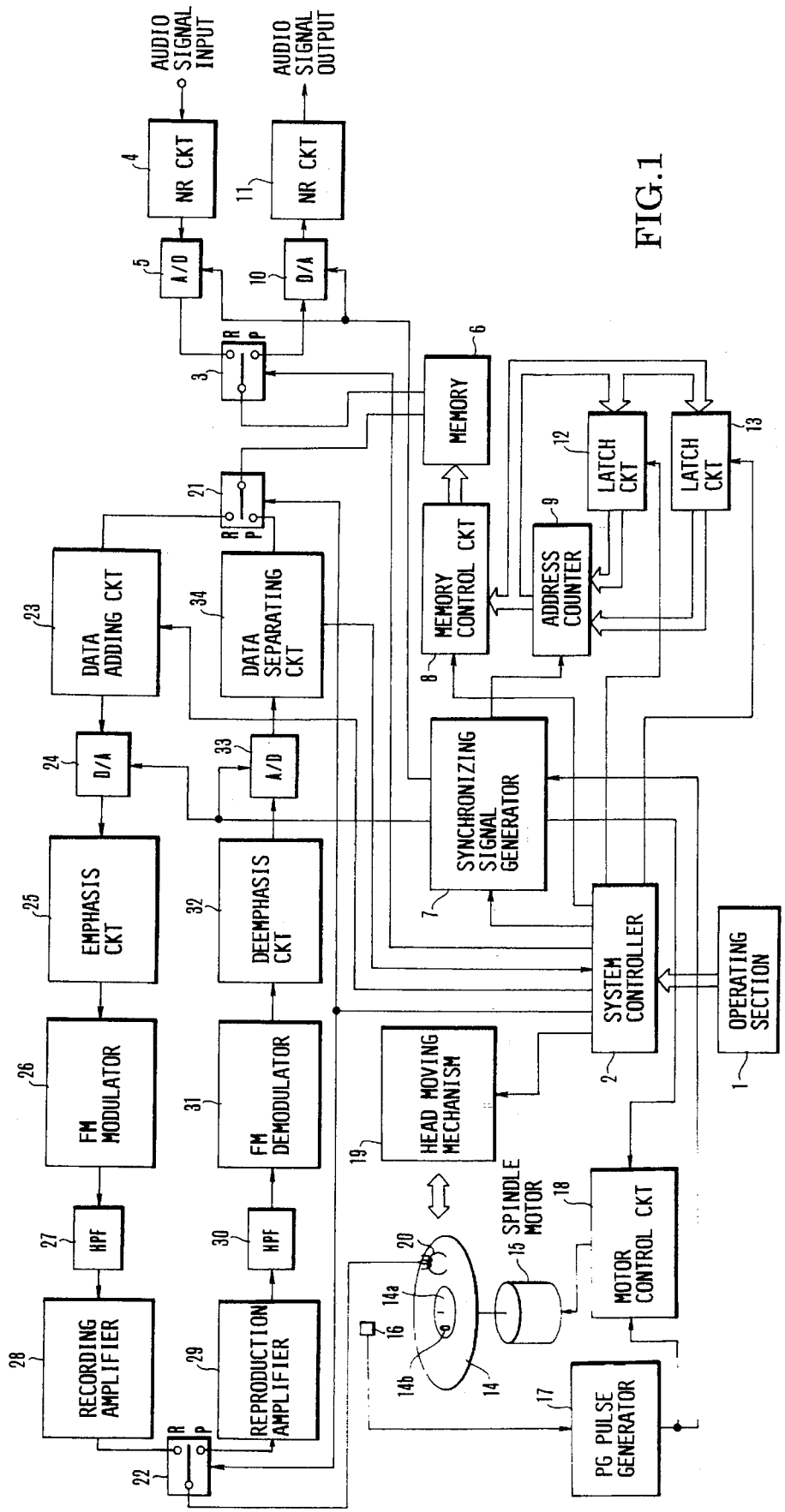
FIG. 1 is a block diagram schematically showing an information signal recording apparatus in accordance with an embodiment of this invention as applied to a still video system.

FIG. 1 schematically shows the configuration of a recording and reproducing apparatus in accordance with an embodiment of this invention as applied to a still video system.

FIG. 1 shows only the audio recording/reproduction section of a recording and reproducing apparatus in a still video system.

First, the operation of recording a sound by means of this invention will be described.

Referring to FIG. 1, the operation of storing a sound is started when a start command is transmitted from an operating section 1 to a system controller 2, which causes a switch 3 to be connected to the R-side. At the same time, audio signals from a microphone (not shown) are supplied through an input terminal to a noise reduction (NR) circuit 4. The audio signals then undergo a predetermined noise reduction processing in the NR circuit 4, and are digitized by an analog/digital (A/D) converter 5. Then, they are supplied to a memory 6 through the switch 3.

When inputting a command for starting the sound storing operation at the operating section 1, the operator determines the length of a sound recorded per track by selecting a desired recording mode before instructing the system controller 2 to start. Here, the sound recording is performed in a mode in which a ten-second sound is recorded for each track (hereinafter referred to as "10-second recording mode").

When, in the operating section 1 the 10-second recording mode is selected as stated above, the system controller 2 instructs a synchronizing signal generator 7 to supply clock signals with a frequency of about 10 KHz to the A/D converter 5, where A/D conversion is conducted in synchronism with the clock signals supplied.

Further, when at the operating section 1 the 10-second recording mode is selected as stated above, the system controller 2 instructs a memory control circuit 8 to set the memory 6 in the data write condition for ten seconds.

An address counter 9 successively supplies write address data to the memory control circuit 8 in synchronism with the synchronizing signals output from the synchronizing signal generator 7, and the memory control circuit 8 stores the audio data supplied from the A/D converter 5 at those addresses in the memory 6 designated by the write address data supplied from the address counter 9.

When the storage of the audio data in the memory 6 has been thus completed, the audio data thus stored may be immediately recorded on the magnetic disk. In this embodiment, however, the operator can check the contents of the audio data stored in the memory 6, deleting or modifying an arbitrary portion of the audio data stored.

Thus, after completing the storage of the audio data as described above, the operator manipulates the operating section 1, instructing the system controller 2 to start the reading of the audio data stored in the memory 6.

Then, in response to the instruction from the system controller 2 to start the reading of the audio data, the switch 3 is connected to the P-side in FIG. 1, and the memory control circuit 8 sets the memory 6 in the readout condition. Further, the readout address data output from the address counter 9 are input to the memory control circuit 8 in synchronism with the synchronizing signals output from the synchronizing signal generator 7, and the memory control circuit 8 successively reads out the audio data stored at those memory addresses designated by the readout address data, the audio data read out being supplied through the switch 3 to a digital/analog (D/A) converter 10.

The D/A converter 10 then conducts the D/A conversion of the supplied audio data in accordance with the clock signals output from the synchronizing signal generator 7. The audio data then undergoes a predetermined noise reduction process in an NR circuit 11 and is output through an output terminal, the sound stored in the memory 6 being reproduced through an amplifier, speaker or the like (not shown).

Thus, the operator can check the contents of the audio data stored in the memory 6.

Next to be described will be the operation of checking the contents of the audio data stored in the memory 6 and of deleting an arbitrary portion thereof before recording it on the magnetic disk.

First, the operator manipulates the operating section 1, instructing the system controller 2 to start the readout of the audio data stored in the memory 6.

Then, as in the above-described case, the reproduction of a sound is conducted in correspondence with the audio data stored in the memory 6.

The operator then checks the sound reproduced, and manipulates a start switch provided in the operating section 1 when the portion to be deleted starts to be reproduced. When the portion to be deleted has come to its end, the operator manipulates an end switch provided in the operating section 1.

When, the start switch of the operating section 1 has been thus manipulated, the system controller 2 instructs a latch circuit 12 to perform a latch operation, the readout address data output from the address counter 9 at that time being latched by the latch circuit 12. Further, when the end switch of the operating section 1 is manipulated, the system controller 2 instructs a latch circuit 13 to perform a latch operation, the readout address data output from the address counter 9 at that time being latched by the latch circuit 13.

When, of the audio data stored in the memory 6, that portion which is to be deleted has been designated, the operator manipulates a recording start switch and a deletion switch which are provided in the operating section 1, thereby causing the audio data stored in the memory 6 to be read out and recorded on the magnetic disk 14, with that portion thereof which has been designated as described above deleted.

Thus, when the deletion switch of the operating section 1 has been manipulated, the address data latched by the latch circuits 12 and 13 is input to the address counter 9, and, when outputting readout address data from the address counter 9, the memory control circuit 8 is supplied with address data from which the readout address latched by the latch circuit 12 to the readout address latched by the latch circuit 13 have been deleted.

When the recording start switch of the operating section 1 is manipulated, the system controller 2 causes the magnetic disk 14 to be rotated at a predetermined speed by a spindle motor 15. The magnetic disk 14 has a core 14a on which a magnetic piece 14b is provided. When this magnetic piece 14b moves across a detection coil 16, the latter generates a detection pulse. The detection pulse generated undergoes a waveform shaping process in a PG pulse generator 17 and is supplied to a motor control circuit 18 as a PG pulse synchronized with the rotation period of the magnetic disk 14.

The motor control circuit 18 is supplied with a reference signal by the synchronizing signal generator 7. The motor control circuit 18 controls the spindle motor 15 in such a manner that the supplied reference signal and the PG pulse are in a predetermined phase relationship with each other, thereby causing the magnetic disk 14 to rotate at a predetermined speed.

When the condition is attained where the magnetic disk 14 rotates at a predetermined speed, a head moving mechanism 19 causes a magnetic head 20 to move to that track position on the magnetic disk 14 which has been designated by the operator by manipulating the operating section 1.

When, after the completion of the movement of the magnetic head 20 to the designated track on the magnetic disk 14, a PG pulse is input to the system controller 2 from the PG pulse generator 17, the system controller 2 connects switches 21 and 22 to the R-side in FIG. 1, and, at the same time, instructs the memory control circuit 8 to set the memory 6 in the readout condition, the audio data read out from the memory 6 being supplied through the switch 21, which is connected to the R-side, to a data adding circuit 23.

The data adding circuit 23 serves to adapt the form of the audio data read out from the memory 6 to the audio recording format.

Figure 2:
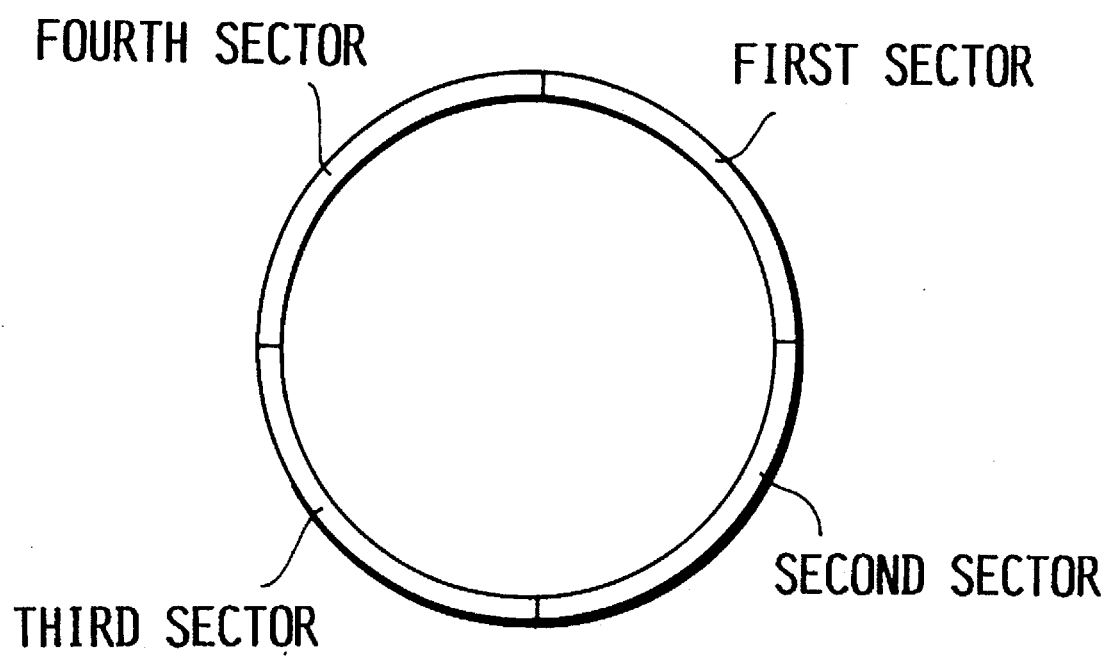
FIG. 2 shows an arrangement of audio track sectors on a magnetic disk.

In a still video system, each audio recording track on the magnetic disk 14 is divided into four sectors, as shown in FIG. 2. In the case of the 10-second recording mode, audio data of a 2.5-second duration is recorded in each sector.

FIG. 3(a) shows the way signals are recorded in each sector.

As shown in FIG. 3(a), after a period $t_1$ has elapsed from the point $T_0$, a start ID signal for obtaining the timing for reading out the audio data is kept at level $L_H$ for a period $t_2$, which is followed by a blank of a period $t_3$. This blank is followed by signals having a duration $t_4$ and representing various categories of control data, such as a number of the disk track where the audio data is recorded, numbers of the first and following tracks when the audio data is recorded on several tracks, a number of the track where the video signal corresponding to the audio data concerned is recorded, and the audio data recording mode. After a blank of a duration $t_5$, the audio data comes, which lasts a period $t_6$. When the 10-second recording mode is selected, as stated above, this period $t_6$ corresponds to audio data of a 2.5-second duration. The audio data is followed by a blank of a duration $t_7$, which is followed by an end ID signal for detecting the termination of the audio data. The end ID signal, which lasts a period $t_8$, is followed by a blank of a duration $t_9$. With the termination of this blank, one sector comes to its end.

Thus, the data adding circuit 23 adds, in accordance with the instructions from the system controller 2, a start ID signal, signals representing various categories of information data, and an end ID signal to the audio data read out from the memory 6, and supplies them to a D/A converter 24 on the output side thereof.

In the condition shown in FIG. 3(a), no portion of the audio data has been deleted yet, whereas, in the condition shown in FIG. 3(b), the audio data portion designated by manipulating the start switch and the end switch of the operating section 1 in the manner described above has been deleted.

In this example, the audio data portion corresponding to a period $t_{10}$ shown in FIG. 3(a) has been deleted, leaving a blank of a duration $t_{11}$, as shown in FIG. 3(b).

Thus, the signals which are output from the data adding circuit 23 and which have the form shown in FIGS. 3(a) and 3(b) undergo D/A conversion in the D/A converter 24 in synchronism with the clock signals output from the synchronizing signal generator 7.

The clock signals output from the synchronizing signal generator 7 during this process have a frequency 640 times higher than those of the clock signals supplied to the A/D converter 5 and the D/A converter 10. Thus, the D/A converter 24 outputs audio signals which have been time-axis-compressed.

The time-axis-compressed audio signals formed in the manner as described above undergo an emphasis processing in an emphasis circuit 25. Then, they are FM-modulated by an FM modulator 26, and the signals with extra frequency components are removed therefrom. They are then amplified by a recording amplifier 28 and are transmitted through the switch 22, which is connected to the R-side in FIG. 1, to the magnetic head 20, where they are recorded on the recording track on the magnetic disk 14 by the magnetic head 20.

Thus, this embodiment allows audio data stored in the memory 6 to be recorded on the magnetic disk 14 with part of it deleted therefrom. Next to be described will be a case where audio data stored in the memory 6 is recorded on the magnetic disk 14 with part of it replaced by new audio data.

First, as in the case where part of audio data stored in the memory 6 is deleted, the start switch and the end switch of the operating section 1 are manipulated so as to designate the audio data portion which is to be replaced with new audio data.

When the designation of the audio data portion to be replaced by new audio data has been completed, the operator manipulates the recording start switch and a replacing switch, which are provided in the operating section 1, thereby causing the audio data stored in the memory 6 to be recorded on the magnetic disk 14 with its portion designated by means of the start switch and the end switch of the operating section 1 replaced by new audio data.

Thus, when the replacing switch in the operating section 1 is appropriately manipulated, the system controller 2 instructs the memory control circuit 8 to set the memory 6 in the data write condition, and the address data latched by the latch circuits 12 and 13 are input to the address counter 9. The address counter 9 supplies to the memory control circuit 8 the address data latched by the latch circuit 12 to the address data latched by the latch circuit 13 as write address data.

Further, when the replacing switch of the operating section 1 is manipulated, the system controller 2 causes the switch 3 to be connected to the R-side in FIG. 1, new audio signals from the microphone (not shown) being input through the input terminal. The input audio signals undergo a noise reduction processing in the NR circuit 4, and are digitized by the A/D converter 5 before being supplied to the memory 6 through the switch 3, which is connected to the R-side in FIG. 1.

The new audio data thus supplied from the A/D converter 5 is stored, as in the case described above, at the addresses in the memory 6 designated by the write address data output from the address counter 9, and takes the place of the audio data which has already been recorded.

When the replacement of audio data has been thus completed, the recording start switch of the operating section 1 is manipulated. When the condition is attained where the magnetic disk 14 rotates at a predetermined speed and the magnetic head 20 has been moved to the track position designated by the operator by manipulating the operating section 1, the system controller 2 connects the switches 21 and 22 to the R-side in FIG. 1 in synchronism with the PG pulses output from the PG pulse generator 17, reading out the audio data stored in the memory 6. The audio data read from the memory 6 is then recorded on the magnetic disk 14, as in the case described above.

Thus, with the still video system of this embodiment, sound can be recorded on a magnetic disk after deleting or correcting only a designated portion thereof, thus making it possible to delete or correct an arbitrary portion of audio data to be recorded.

Next, the operation of reproducing a sound using the still video system shown in FIG. 1 will be described.

Prior to the reproduction of a sound, the operator manipulates the operating section 1 so as to select an arbitrary track on the magnetic disk 14, and then manipulates a reproduction start switch in the operating section 1, thereby starting the sound reproducing operation.

When the reproduction start switch of the operating section 1 is manipulated, the system controller 2 causes the magnetic disk 14 to be rotated at a predetermined speed by the spindle motor 15, as in the above-described recording operation. When the condition has been attained where the magnetic disk 14 rotates at a predetermined speed, the head moving mechanism 19 moves the magnetic head 20 to the position designated by the operator by means of the operating section 1.

When, after the completion of the movement of the magnetic head 20 to the designated track on the magnetic disk 14, a PG pulse is input to the system controller 2 from the PG pulse generator 17, the system controller 2 connects the switches 21 and 22 to the P-side and causes the memory control circuit 8 to set the memory 6 in the write condition.

The signals reproduced by the magnetic head 20 are supplied through the switch 22, which is connected to the P-side, to a reproduction amplifier 29, where they are amplified. Afterwards, the signals with extra frequency components are removed from them by a HPF (high-pass filter) 30, the signal being supplied to an FM demodulator 31.

After having been FM-demodulated by the FM demodulator 31, the signals undergo in a deemphasis circuit 32 a deemphasis process which is of a characteristic reverse to that of the emphasis process performed in the recording process. Afterwards, the signals are digitized by an A/D converter 33 and are supplied to a data separating circuit 34.

The data separating circuit 34 separates the start ID signal, the end ID signal, and the various categories of information data, which have been added to the audio data, from each other, and supplies them to the system controller 2.

The system controller 2 then controls the reproducing operation in accordance with the start ID signal, the end ID signal and the various categories of information data supplied from the data separating circuit 34. A detailed description of this operation will be omitted here.

The audio data thus separated by the data separating circuit 34 is supplied to the memory 6 through the switch 21, which is connected to the P-side.

At the same time, the write address data from the address counter 9 is successively supplied to the memory control circuit 8 in synchronism with the synchronizing signals supplied by the synchronizing signal generator 7, and the memory control circuit 8 causes the memory 6 to store the audio data supplied from the data separating circuit 34 at memory addresses designated by the write address data supplied from the address counter 9.

When the storage of audio data has been thus completed, the system controller 2 causes the reading of the data stored in the memory 6 to be started.

In response to the instruction from the system controller 2 to start the reading of the audio data, the switch 3 is connected to the P-side, and the memory control circuit 8 sets the memory 6 in the readout condition. Further, the readout address data output from the address counter 9 in synchronism with the synchronizing signals output from the synchronizing signal generator 7 are input to the memory control circuit 8, and the audio data stored at memory addresses designated by the readout address data is read successively. The audio data thus read out is supplied to the D/A converter 10 through the switch 3, which is connected to the P-side.

Then, the D/A converter 10 conducts the D/A conversion of the supplied audio data in accordance with the clock signals supplied from the synchronizing signal generator 7. The audio data further undergoes a predetermined noise reduction processing in the NR circuit 11. Afterwards, the audio data stored in the memory 6 is transmitted through the output terminal and is reproduced through an amplifier, speaker or the like (not shown).

In this way, the information signal recording apparatus of this embodiment applied to a still video system makes it possible to delete or correct an arbitrarily designated portion of a sound prior to recording it.

Thus, this invention provides an information-signal recording apparatus which is easy to use.

What is claimed is:

1. An information signal recording apparatus for recording information signals on a recording medium, comprising:

(A) clock signal generating means for generating a first clock signal having a first frequency and a second clock signal having a second frequency higher than said first frequency;

(B) analog/digital converting means arranged to input a predetermined quantity of the information signals, to convert the inputted predetermined quantity of the information signals into digital information signals in synchronism with said first clock signal generated by said clock signal generating means and to output the digital information signals;

(C) memory means for storing temporarily the digital information signals to change a data rate of the digital information signals outputted from said analog/digital converting means;

(D) instruction means for instructing to delete an arbitrarily-selected portion among the digital information signals stored in said memory means;

(E) memory control means arranged to store the digital information signals outputted from said analog/digital converting means in said memory means in synchronism with said first clock signal generated by said clock signal generating means, to designate exclusively addresses in said memory means wherein the digital information signals stored in said memory means corresponding to said arbitrarily-selected portion of the digital information signals instructed by said instruction means are stored, among the addresses in said memory means where the digital information signals are stored, and to read out the digital information signals stored in the designated addresses of said memory means in synchronism with said second clock signal generated by said clock signal generating means; and (F) recording means for recording the digital information signals read out from said memory means onto a recording medium different from said memory means.

2. An apparatus according to claim 1, wherein said information signals include an audio signal.

3. An apparatus according to claim 1, wherein said recording medium includes a disc shaped recording medium.

4. An apparatus according to claim 1, wherein said recording medium includes a magnetic recording medium.

5. An information signal recording apparatus for recording information signals on a recording medium, comprising:

(A) clock signal generating means for generating a first clock signal having a first frequency and a second clock signal having a second frequency higher than said first frequency;

(B) analog/digital converting means arranged to input a predetermined quantity of the information signals, to convert the inputted predetermined quantity of the information signals into digital information signals in synchronism with said first clock signal generated by said clock signal generating means and to output the digital information signals;

(C) memory means for storing temporarily the digital information signals to change a data rate of the digital information signals outputted from said analog/digital converting means;

(D) instruction means for instructing to change an arbitrarily-selected portion among the digital information signals stored in said memory means to another digital information signals outputted from said analog/digital converting means;

(E) memory control means arranged to store the digital information signals outputted from said analog/digital converting means in said memory means in synchronism with said first clock signal generated by said clock signal generating means, to designate exclusively addresses in said memory means wherein the digital information signals stored in said memory means corresponding to arbitrarily-selected portion of the digital information signals instructed by said instruction means are stored, among the addresses in said memory means where the digital information signals are stored, and to rewrite the digital information signal stored in the designated addresses of said memory means into said another digital information signals outputted from said analog/digital converting means and then to read out the digital information signals, stored in the addresses of said memory means which include those in the address which has been rewritten to said another digital information signals, in synchronism with a second clock signal generated by said clock signal generating means; and (F) recording means for recording the digital information signals output from said memory means onto a recording medium different from said memory means.

6. An apparatus according to claim 5, wherein said information signals include an audio signal.

7. An apparatus according to claim 5, wherein said recording medium includes a disc shaped recording medium.

8. An apparatus according to claim 5, wherein said recording medium Includes a magnetic recording medium.

* * * * *

UNITED STATES PATENT AND TRADEMARK OFFICE
CERTIFICATE OF CORRECTION

PATENT NO. : 5,592,339
DATED : January 7, 1997
INVENTOR(S) : Kimura et al.

It is certified that error appears in the above-identified patent and that said Letters Patent is hereby corrected as shown below:

Col. 10, line 17, delete "Includes" and insert -- includes --.

Signed and Sealed this

Thirtieth Day of June, 1998

Attest:

BRUCE LEHMAN

Attesting Officer

Commissioner of Patents and Trademarks